(12) United States Patent
Jiang

(10) Patent No.: US 11,044,738 B2
(45) Date of Patent: Jun. 22, 2021

(54) METHOD AND DEVICE FOR SENDING CONTROL PROTOCOL DATA UNIT (PDU)

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/348,226

(22) PCT Filed: Nov. 9, 2016

(86) PCT No.: PCT/CN2016/105202
§ 371 (c)(1),
(2) Date: May 8, 2019

(87) PCT Pub. No.: WO2018/086010
PCT Pub. Date: May 17, 2018

(65) Prior Publication Data
US 2019/0274152 A1 Sep. 5, 2019

(51) Int. Cl.
*H04W 72/12* (2009.01)
*H04L 5/00* (2006.01)
(Continued)

(52) U.S. Cl.
CPC ....... *H04W 72/1242* (2013.01); *H04L 5/0055* (2013.01); *H04W 28/065* (2013.01);
(Continued)

(58) Field of Classification Search
CPC .............. H04L 5/0055; H04W 28/065; H04W 72/1242; H04W 72/1257; H04W 80/02; H04W 72/0486; H04W 72/10
See application file for complete search history.

(56) References Cited

U.S. PATENT DOCUMENTS

2003/0007517 A1* 1/2003 Beckmann ........... H04B 7/2612
370/537
2004/0208160 A1* 10/2004 Petrovic ................ H04L 1/1835
370/350
(Continued)

FOREIGN PATENT DOCUMENTS

CN 1964362 A 5/2007
CN 101141445 A 3/2008
(Continued)

OTHER PUBLICATIONS

3GPP, "3G TS 25.331 version 3.1.0 (Jan. 2000) 3rd Generation Partnership Project; Technical Specification Group Radio Access Network; RRC Protocol Specification (3G TS 25.331 version 3.1.0 Release 1999)", Jan. 2000, 3GPP, version 3.1.0, pp. 1-282 (Year: 2000).*
(Continued)

*Primary Examiner* — Un C Cho
*Assistant Examiner* — Shah M Rahman
(74) *Attorney, Agent, or Firm* — Finnegan, Henderson, Farabow, Garrett & Dunner, L.L.P.

(57) ABSTRACT

The present disclosure relates to a method and device for sending a control protocol data unit (PDU) and belongs to the field of communication technologies. The method comprises: establishing a dedicated bearer for transporting a control PDU; when a control PDU to be sent exists, sending, on a logical channel to which the dedicated bearer corresponds, the control PDU to a media access control (MAC) entity of the communication device through a radio link control (RLC) entity of the communication device; and sending the control PDU through the MAC entity according to a promoted priority of the logical channel. The present disclosure can shorten the sending delay of the control PDU.

10 Claims, 4 Drawing Sheets

(51) Int. Cl.
*H04W 28/06* (2009.01)
*H04W 80/02* (2009.01)
*H04W 72/10* (2009.01)

(52) U.S. Cl.
CPC ....... *H04W 72/1257* (2013.01); *H04W 80/02* (2013.01); *H04W 72/10* (2013.01)

(56) References Cited

U.S. PATENT DOCUMENTS

| | | | |
|---|---|---|---|
| 2005/0135416 A1* | 6/2005 | Ketchum | H04L 29/06 370/469 |
| 2005/0265301 A1* | 12/2005 | Heo | H04W 72/1284 370/349 |
| 2006/0088058 A1* | 4/2006 | Eckert | H04L 47/10 370/469 |
| 2006/0209896 A1* | 9/2006 | Choi | H04L 1/1874 370/469 |
| 2007/0133605 A1* | 6/2007 | Herrmann | H04L 1/1812 370/473 |
| 2007/0177628 A1* | 8/2007 | Choi | H04W 72/02 370/469 |
| 2009/0046631 A1* | 2/2009 | Meylan | H04W 80/02 370/328 |
| 2009/0215456 A1* | 8/2009 | Chun | H04W 72/1257 455/435.1 |
| 2009/0225711 A1* | 9/2009 | Sammour | H04W 72/1263 370/329 |
| 2009/0323671 A1* | 12/2009 | Wu | H04L 1/1887 370/352 |
| 2009/0325634 A1* | 12/2009 | Bienas | H04W 72/0426 455/552.1 |
| 2011/0310769 A1* | 12/2011 | Lee | H04L 67/12 370/254 |
| 2014/0029564 A1 | 1/2014 | Harada et al. | |
| 2014/0098761 A1* | 4/2014 | Lee | H04W 72/005 370/329 |
| 2016/0234714 A1* | 8/2016 | Basu Mallick | H04W 16/32 |
| 2017/0041933 A1* | 2/2017 | Sammour | H04W 72/1263 |
| 2017/0257876 A1* | 9/2017 | Loehr | H04W 28/0278 |
| 2018/0255499 A1* | 9/2018 | Loehr | H04W 72/1242 |
| 2019/0124674 A1* | 4/2019 | Lee | H04W 76/27 |
| 2019/0261450 A1* | 8/2019 | Adachi | H04W 88/04 |

FOREIGN PATENT DOCUMENTS

| | | |
|---|---|---|
| CN | 101682916 A | 3/2010 |
| CN | 102104916 A | 6/2011 |
| CN | 102474874 A | 5/2012 |
| EP | 2 076 088 A1 | 7/2009 |
| GB | 2502581 A | 12/2013 |
| WO | WO 2009097273 A1 | 8/2009 |

OTHER PUBLICATIONS

3GPP, "3GPP TS 25.322 V6.2.0 (Dec. 2004) 3rd Generation Partnership Project; Technical Specification Group Radio Access Network; Radio Link Control (RLC) protocol specification (Release 6)", Dec. 2004, 3GPP, V6.2.0, pp. 1-82 (Year: 2004).*
First Office Action of Chinese application No. 201680001307.0, dated Jul. 23, 2019.
Second Office Action of Chinese application No. 201680001307.0 dated Jan. 15, 2020.
Extended European Search Report of counterpart EP application No. 16921363.4 dated Mar. 18, 2020.
International Search Report and Written Opinion of PCT Application No. PCT/CN2016/105202, dated Jul. 11, 2017, issued by the ISA/CN—State Intellectual Property Office of the P.R. China.
Chuqian Wei, CDMA Mobile Communication System, Dec. 31, 2008, pp. 185-188.
Notification to Grant Patent Right for Invention of Chinese Application No. 201680001307.0 dated May 27, 2020.

* cited by examiner

METHOD AND DEVICE FOR SENDING CONTROL PROTOCOL DATA UNIT (PDU)

CROSS REFERENCE TO RELATED APPLICATIONS

This application is a national phase application based on PCT/CN2016/105202, filed Nov. 9, 2016, the content of which is incorporated herein by reference.

TECHNICAL FIELD

The present disclosure relates to the field of communication technologies, and in particular, to a method and device for sending a control protocol data unit (PDU).

BACKGROUND

Protocol data units (PDU) of radio link control (RLC) entity include data PDU and control PDU, wherein the control PDU can include RLC status report.

When the RLC entity in a communication device needs to send the PDU to a media access control (MAC) entity on a logical channel, the RLC entity indicates the size of the amount of data to be sent to the MAC entity. In each scheduling cycle, the MAC entity allocates transportation resources according to the priority and quality of service (QoS) of the logical channel. After determining the transportation resources, the RLC entity preferentially packages control PDUs and then packages data PDUs so as to adapt to the size of the transportation resources, and sends, on the corresponding logical channel, the data obtained through packaging to the MAC entity. The MAC entity forwards the PDUs.

SUMMARY

In order to solve the problem in the related art, the present disclosure provides a method and device for sending a control protocol data unit (PDU).

According to a first aspect of the present disclosure, there is provided a method for sending a control protocol data unit (PDU). The method is used in a communication device, and the method comprises: establishing a dedicated bearer for transporting a control PDU; sending, on a logical channel to which the dedicated bearer corresponds, a control PDU to a media access control (MAC) entity of the communication device through a radio link control (RLC) entity of the communication device when the control PDU to be sent exists; and sending the control PDU through the MAC entity according to the promoted priority of the logical channel.

Optionally, the logical channel to which the dedicated bearer corresponds is a dedicated logical channel only for transporting the control PDU.

Optionally, the method further comprises: setting a bearer identifier for indicating a data bearer to which the control PDU belongs, for the control PDU.

Optionally, bearer configuration information of the data bearer to which the control PDU belongs comprises first indication information, and the first indication information is used to indicate whether to send the control PDU on the dedicated logical channel.

Optionally, the dedicated bearer is a bearer which is preferentially scheduled when the control PDU is sent on the corresponding logical channel.

Optionally, the method further comprises: sending second indication information to the MAC entity through the RLC entity, wherein the second indication information is used to indicate that the control PDU is to be sent on the logical channel.

Optionally, the method further comprises: sending the data amount of the control PDU to the MAC entity through the RLC entity, wherein the data amount is used to determine, by the MAC entity, the size of a resource block allocated for the control PDU.

Optionally, the method further comprises: generating and sending bearer configuration information for configuring the dedicated bearer when the communication device is a base station, wherein the bearer configuration information is used to instruct a user equipment (UE) to configure the dedicated bearer; and receiving the bearer configuration information of the dedicated bearer, which is generated and sent by the base station, when the communication device is the UE, and configuring the established dedicated bearer according to the bearer configuration information.

Optionally, when the logical channel to which the dedicated bearer corresponds is the dedicated logical channel, the bearer configuration information of the dedicated bearer comprises RLC entity configuration information and logical channel configuration information, the RLC entity configuration information comprises acknowledged mode (AM) configuration information and does not comprise packet data convergence protocol (PDCP) configuration information, and the logical channel configuration information comprises first priority information; or the bearer configuration information of the dedicated bearer comprises RLC entity configuration information, the RLC entity configuration information comprises AM configuration information and first priority information and does not comprise PDCP configuration information; or the RLC entity configuration information comprises AM configuration information and does not comprise PDCP configuration information and first priority information, and the first priority information is pre-stored in the communication device; and wherein the first priority information is used to indicate the promoted priority of the dedicated logical channel.

Optionally, when the dedicated bearer is the bearer which is preferentially scheduled when the control PDU is sent on the corresponding logical channel, the bearer configuration information of the dedicated bearer comprises RLC entity configuration information and logical channel configuration information, the RLC entity configuration information comprises AM configuration information; the logical channel configuration information comprises third indication information and second priority information; or the logical channel configuration information comprises third indication information and does not comprise second priority information, and the second priority information is pre-stored in the communication device; or the bearer configuration information of the dedicated bearer comprises RLC entity configuration information, the RLC entity configuration information comprises AM configuration information, third indication information and second priority information; or the RLC entity configuration information comprises AM configuration information and third indication information and does not comprise second priority information, and the second priority information is pre-stored in the communication device; and the third indication information is used to indicate that the bearer is preferentially scheduled when the control PDU is sent on the corresponding logical channel, and the second priority information is used to indicate the promoted priority of the logical channel.

According to a second aspect of the present disclosure, there is provided a device for sending a control protocol data unit (PDU). The device is used in a communication device and the device comprises: a bearer establishment module configured to establish a dedicated bearer for transporting a control PDU; a first sending module configured to send, on a logical channel to which the dedicated bearer established by the bearer establishment module corresponds, a control PDU to a media access control (MAC) entity of the communication device through a radio link control (RLC) entity of the communication device when the control PDU to be sent exists; and a second sending module configured to send the control PDU through the MAC entity according to the promoted priority of the logical channel.

Optionally, the logical channel to which the dedicated bearer corresponds is a dedicated logical channel only for transporting the control PDU.

Optionally, the device further comprises: an identifier setting module configured to set a bearer identifier for indicating a data bearer to which the control PDU belongs, for the control PDU.

Optionally, bearer configuration information of the data bearer to which the control PDU belongs comprises first indication information, and the first indication information is configured to indicate whether to send the control PDU on the dedicated logical channel.

Optionally, the dedicated bearer is a bearer which is preferentially scheduled when the control PDU is sent on the corresponding logical channel.

Optionally, the device further comprises: a third sending module configured to send second indication information to the MAC entity through the RLC entity, wherein the second indication information is configured to indicate that the control PDU is to be sent on the logical channel.

Optionally, the device further comprises: a fourth sending module configured to send the data amount of the control PDU to the MAC entity through the RLC entity, wherein the data amount is configured to determine, by the MAC entity, the size of a resource block allocated for the control PDU.

Optionally, the device further comprises: a first configuration module configured to generate and send bearer configuration information for configuring the dedicated bearer when the communication device is a base station, wherein the bearer configuration information is configured to instruct a user equipment (UE) to configure the dedicated bearer; and a second configuration module configured to receive the bearer configuration information of the dedicated bearer, which is generated and sent by the base station, when the communication device is the UE, and configure the established dedicated bearer according to the bearer configuration information.

Optionally, when the logical channel to which the dedicated bearer corresponds is the dedicated logical channel, the bearer configuration information of the dedicated bearer comprises RLC entity configuration information and logical channel configuration information, the RLC entity configuration information comprises acknowledged mode (AM) configuration information and does not comprise packet data convergence protocol (PDCP) configuration information, and the logical channel configuration information comprises first priority information; or the bearer configuration information of the dedicated bearer comprises RLC entity configuration information, the RLC entity configuration information comprises AM configuration information and first priority information and does not comprise PDCP configuration information; or the RLC entity configuration information comprises AM configuration information and does not comprise PDCP configuration information and first priority information, and the first priority information is pre-stored in the communication device; and wherein the first priority information is configured to indicate the promoted priority of the dedicated logical channel.

Optionally, when the dedicated bearer is a bearer which is preferentially scheduled when the control PDU is sent on the corresponding logical channel, the bearer configuration information of the dedicated bearer comprises RLC entity configuration information and logical channel configuration information, the RLC entity configuration information comprises AM configuration information; the logical channel configuration information comprises third indication information and second priority information; or the logical channel configuration information comprises third indication information and does not comprise second priority information, and the second priority information is pre-stored in the communication device; or the bearer configuration information of the dedicated bearer comprises RLC entity configuration information, the RLC entity configuration information comprises AM configuration information, third indication information and second priority information; or the RLC entity configuration information comprises AM configuration information and third indication information and does not comprise second priority information, and the second priority information is pre-stored in the communication device; and the third indication information is used to indicate that the bearer is preferentially scheduled when the control PDU is sent on the corresponding logical channel, and the second priority information is used to indicate the promoted priority of the logical channel.

According to a third aspect of the present disclosure, there is provided a device for sending a control protocol data unit (PDU). The device is used in a communication device and the device comprises a processor; and a memory for storing a processor-executable instruction, wherein the processor is configured to: establish a dedicated bearer for transporting a control PDU; send, on a logical channel to which the dedicated bearer corresponds, a control PDU to a media access control (MAC) entity of the communication device through a radio link control (RLC) entity of the communication device when the control PDU to be sent exists; and send the control PDU through the MAC entity according to the promoted priority of the logical channel.

The technical solutions provided by the present disclosure can include the following benefits.

The control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority, and thus the sending delay of the control PDU can be shortened. After the bearer identifier for indicating the data bearer to which the control PDU belongs is set for the control PDU and since the control PDU needs to be processed by the RLC entity corresponding to the data bearer to which the control PDU belongs, when a plurality of control PDUs are sent on the dedicated logical channel, the RLC entity for processing each control PDU can be determined according to the bearer identifier, thereby guaranteeing that the control PDU can be processed successfully. The first indication information indicates whether to send the control PDU on the dedicated logical channel. As such, when the requirement of certain PDU for delay is not high, the control PDU can be sent on an ordinary logical channel rather than the dedicated logical channel, thereby guaranteeing that the control PDU having the high requirement for delay is sent preferentially. The data amount of the control PDU is sent to the MAC entity through the RLC entity, and since the MAC entity can determine, according to the data amount, the size of the resource block allocated for the control PDU, the MAC entity can allocate enough resource blocks for the control PDU to send the control PDU.

It is to be understood that both the foregoing general description and the follow detailed description are exemplary only and are not restrictive of the present disclosure.

BRIEF DESCRIPTION OF THE DRAWINGS

The drawings herein are incorporated in and constitute a part of this specification of the present disclosure, showing embodiments consistent with the present disclosure, and explaining the principles of the present disclosure together with the description.

DETAILED DESCRIPTION

Figure 1:
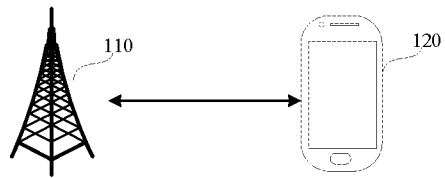
FIG. 1 is a block diagram of a system for sending a control PDU according to various embodiments.

Hereinafter, exemplary embodiments will be described in detail. The embodiments are shown in the drawings. In the following description when referring to the drawings, the same numerals in the different drawings denote the same or similar elements unless otherwise indicated. The embodiments described in the following exemplary embodiments are not representative of all embodiments consistent with the present disclosure. Rather, they are merely examples of devices and methods consistent with some aspects of the present disclosure as detailed in the appended claims.

With reference to FIG. 1 which shows a block diagram of a system for sending a control PDU according to various embodiments of the present disclosure. The system for sending control PDU includes a base station 110 and user equipment (UE) 120. A connection is established between the base station 110 and the UE 120.

The base station 110 is used to generate configuration information, perform configuration and send the configuration information to the UE 120. The UE 120 is used to perform configuration according to the received configuration information. After successful configuration, both the base station 110 and the UE 120 can implement a method for sending a control PDU. Or the configuration information can be written into a standard. The base station 110 and the UE 120 perform configuration when executing the standard and there is no need for the base station 110 to generate the configuration information and send the same to the UE 120.

Since the processes of the base station 110 and the UE 120 for sending the control PDU are consistent except a configuration process, for convenience of description, the base station 110 and the UE 120 are collectively called as communication devices below.

Figure 2:
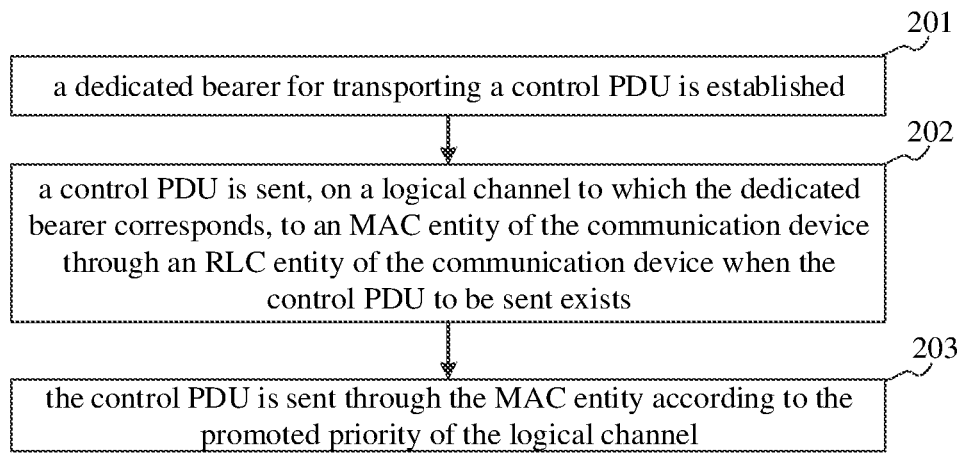
FIG. 2 is a flow chart of a method for sending a control PDU according to one exemplary embodiment.

FIG. 2 is a flow chart of a method for sending a control PDU according to an exemplary embodiment. The method for sending a control PDU is applied to a communication device. As shown in FIG. 2, the method for sending a control PDU includes the following steps.

In step 201, a dedicated bearer for transporting a control PDU is established.

In step 202, a control PDU is sent, on a logical channel to which the dedicated bearer corresponds, to a MAC entity of the communication device through an RLC entity of the communication device when the control PDU to be sent exists.

In step 203, the control PDU is sent through the MAC entity according to the promoted priority of the logical channel.

In summary, for the method for sending a control PDU provided in the present disclosure, the control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority, and thus the sending delay of the control PDU can be shortened.

The present disclosure provides two solutions for promoting the priority for sending the control PDU. The first solution is to establish a dedicated logical channel for the control PDU and is described in detail in the embodiment shown in FIG. 3. The second solution is to preferentially schedule the logical channel for sending the control PDU and is described in detail in the embodiment shown in FIG. 4.

Figure 3:
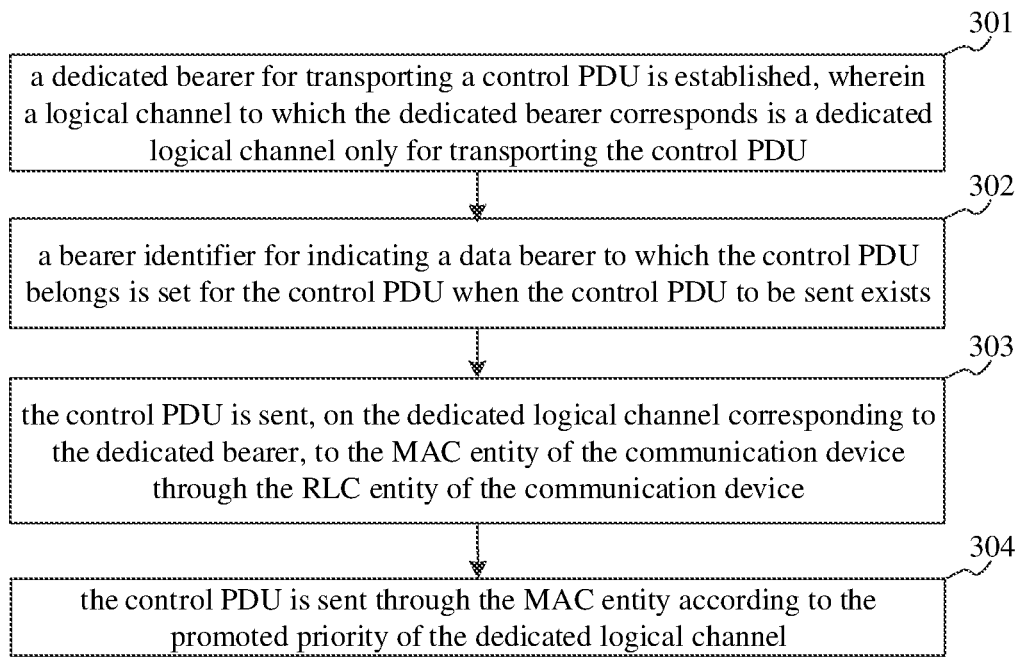
FIG. 3 is a flow chart of a method for sending a control PDU according to another exemplary embodiment.

FIG. 3 is a flow chart of a method for sending a control PDU according to another exemplary embodiment. The method for sending a control PDU is applied to a communication device. As shown in FIG. 3, the method for sending a control PDU includes the following steps.

In step 301, a dedicated bearer for transporting a control PDU is established, wherein a logical channel to which the dedicated bearer corresponds is a dedicated logical channel only for transporting the control PDU.

The control PDU can carry an RLC status report and can also carry other information, and the use of the control PDU is not limited in this embodiment.

The logical channel is a data transportation channel between the RLC entity and the MAC entity in the communication device, and one logical channel corresponds to one bearer. The bearers include a signaling bearer and a data bearer. The signaling bearer is used to transport signaling of a control plane. The data bearer is used to transport data of a user plane.

The dedicated logical channel is only used to transport the control PDU rather than a data PDU. The dedicated logical channel can be a logical channel corresponding to the data bearer and can also be a logical channel corresponding to the signaling bearer. Namely, the data bearer corresponds to one dedicated logical channel and this dedicated logical channel is only used to transport the control PDU of the user plane; and the signaling bearer corresponds to one dedicated logical channel and this dedicated logical channel is only used to transport the control PDU of the control plane.

Since the priority of the logical channel corresponding to the signaling bearer is generally higher than that of the logical channel corresponding to the data bearer and the amount of data transported in the logical channel corresponding to the signaling bearer is not large, the sending delay of the control PDU is not too long when the control PDU is sent through the logical channel corresponding to the signaling bearer. Thus, when the control PDU is sent on the logical channel corresponding to the signaling bearer, there is no need to set the dedicated logical channel for the control PDU. Namely, the control PDU and the data PDU can share the same logical channel corresponding to the signaling bearer.

The communication device needs to establish the dedicated bearer firstly and then configures the same. In the first implementation mode, when the communication device is a base station, bearer configuration information for configuring the dedicated bearer is generated and sent by the base station, and the bearer configuration information is used to instruct user equipment (UE) to configure the dedicated bearer. In the second implementation mode, when the communication device is the UE, the bearer configuration information of the dedicated bearer, which is generated and sent by the base station, is received, and the dedicated bearer is configured according to the bearer configuration information.

During implementation, the base station configures the established dedicated bearer according to the generated bearer configuration information and sends the bearer configuration information to the UE. The UE configures the established dedicated bearer according to the bearer configuration information. After completion of the configuration, the base station and the UE can use the dedicated bearer to transport the control PDU. Optionally, the bearer configuration information can be written into a standard, and the base station and the UE configure the dedicated bearer respectively according to the bearer configuration information when executing the standard. After completion of the configuration, the base station and the UE can use the dedicated bearer to transport the control PDU.

In this embodiment, the bearer configuration information of the dedicated bearer includes RLC entity configuration information and logical channel configuration information. The RLC entity configuration information includes acknowledged mode (AM) configuration information and does not include packet data convergence protocol (PDCP) configuration information. The logical channel configuration information includes first priority information. The first priority information is used to indicate the promoted priority of the dedicated logical channel.

The RLC entity configuration information is used to configure the RLC entity, and the logical channel configuration information is used to configure the dedicated logical channel.

Since the dedicated logical channel only transports the control PDU, the RLC entity configuration information needs to include AM configuration information for configuring an AM and does not need to include PDCP configuration information for configuring a PDCP entity. The PDU transported between the PDCP entity and the RLC entity is data PDU.

When the priority is indicated by a priority value, the first priority information can be a priority value range, so that the communication device flexibly selects the priority value in the priority value range for configuration. For example, when the priority value range is [0, 6], the first priority information can be [0, 6]. The lower the priority value is, the higher the priority is.

However, since the communication device does not determine the priorities of the logical channel corresponding to the signaling bearer and the logical channel which corresponds to the data bearer and is used to transport the data PDU, in order to promote the priority of the dedicated logical channel as far as possible, the first priority information can be set to be the lowest priority value so as to indicate that the priority of the dedicated logical channel is highest.

Of course, when the priorities of the logical channel corresponding to the signaling bearer and the logical channel which corresponds to the data bearer and is used to transport the data PDU are determined, the first priority information can also be set according to the priority values of these priorities. For example, a priority value of the first priority information is set to be higher than a priority value of the logical channel corresponding to the signaling bearer and lower than the priority value of the logical channel used to transport the data PDU so as to indicate that the priority of the dedicated logical channel is lower than the priority of the logical channel corresponding to the signaling bearer and higher than the priority of the logical channel used to transport the data PDU. The setting mode of the first priority information is not limited in this embodiment.

It should be noted that the first priority information can be in the logical channel configuration information, and the bearer configuration information at this time is as shown above. In other implementation modes, the first priority information can be located in the RLC entity configuration information and can also be pre-stored in the communication device, and the bearer configuration information at this time is as shown below.

In this embodiment, the bearer configuration information of the dedicated bearer includes RLC entity configuration information. The RLC entity configuration information includes AM configuration information and the first priority information and does not include PDCP configuration information. Or the RLC entity configuration information includes AM configuration information and does not include PDCP configuration information and first priority information which is pre-stored in the communication device and is used to indicate the promoted priority of the dedicated logical channel.

In such an implementation mode, the bearer configuration information can further include the logical channel configuration information and the logical channel configuration information at this time is the same as that in the related art and is not described herein.

Optionally, the logical channel configuration information can further include a channel identifier and the channel identifier is used to identify the dedicated logical channel between the RLC entity and the MAC entity. For example, when the RLC entity sends, on the dedicated logical channel, information to the MAC entity, the channel identifier of the dedicated logical channel can be carried in the information, and the MAC entity can recognize the dedicated logical channel according to the channel identifier.

Optionally, the logical channel configuration information can further include information about whether to enable the dedicated logical channel. This is because delay requirements for certain business are not high. Therefore, there is no need to preferentially send the control PDU and at this time, the dedicated logical channel can not be enabled.

In step 302, a bearer identifier for indicating a data bearer to which the control PDU belongs is set for the control PDU when the control PDU to be sent exists.

The control PDU can only be processed by the RLC entity corresponding to the data bearer to which the control PDU belongs and there is a corresponding relationship between each RLC entity and the data bearer. In the related art, since the logical channel which sends the control PDU uniquely corresponds to one data bearer, a receiver can determine the corresponding RLC entity according to the data bearer corresponding to the logical channel which transports the control PDU. In this embodiment, since all of the control PDUs are transported through the dedicated logical channel and the receiver cannot determine the data bearer corresponding to the dedicated logical channel, it needs to set the bearer identifier for indicating the data bearer, to which the control PDU belongs, for the control PDU, thereby determining, according to this bearer identifier, the RLC entity that processes each control PDU and guaranteeing that the control PDU can be processed successfully. The location of the bearer identifier in the control PDU is not limited in this embodiment.

Optionally, bearer configuration information of the data bearer to which the control PDU belongs includes first indication information, and the first indication information is used to indicate whether to send the control PDU on the dedicated logical channel. As such, when the requirement of certain PDU for delay is not high, the control PDU can be sent on an ordinary logical channel rather than the dedicated logical channel, thereby guaranteeing that the control PDU having the high requirement for delay is sent preferentially.

In step 303, the control PDU is sent, on the dedicated logical channel corresponding to the dedicated bearer, to the MAC entity of the communication device through the RLC entity of the communication device.

After the dedicated bearer is configured and the control PDU is generated, the communication device can use the dedicated bearer to send the control PDU. In the sending process, when determining that the control PDU is triggered, namely, the control PDU to be sent exists, the RLC entity calculates the data amount of the control PDU and sends the data amount to the MAC entity; the MAC entity determines the promoted priority of the dedicated logical channel, allocates a resource block for the control PDU according to the priority and sends the size of the resource block to the RLC entity; and the RLC entity sends, on the dedicated logical channel, the control PDU to the MAC entity according to the size of the resource block.

When the data amount of the control PDU is calculated, when only one control PDU exists, the RLC entity directly calculates the data amount of this control PDU and sends the obtained data amount to the MAC entity. When the number of the control PDUs to be sent is n and n≥2, the RLC entity calculates the data amount of each control PDU, and the sum of the data amounts of n obtained control PDUs is used as the data amount. The technology for calculating the data amount of the control PDUs is very mature and is not described herein. For example, when n is 3, the data amount of the first control PDU to be sent is 50 bits, the data amount of the second control PDU to be sent is 60 bits and the data amount of the third control PDU to be sent is 80 bits, the data amount obtained by the RCL entity through calculation is 50+60+80=190 bits. Then the 190 bits are sent, as the data amount, to the MAC entity.

The communication device can send a plurality of control PDUs on one dedicated logical channel at the same time, thereby improving the sending efficiency of the control PDUs.

The MAC entity determines the priority of the dedicated logical channel according to the first priority information. Optionally, except the priority, the MAC entity can also allocate the resource block for the control PDU according to other parameters such as QoS.

It should be noted that when the resource block allocated by the MAC entity is relatively smaller, even though the RLC entity has calculated the data amounts of the n control PDUs, the RLC entity can still only transport part of control PDUs of the n control PDUs and sends, on the dedicated logical channel, this control PDUs to the MAC entity. For example, when five control PDUs to be set exist and the resource block allocated by the MAC entity can only send three control PDUs, the RLC entity sends, on the dedicated logical channel, the first three control PDUs, which are triggered, to the MAC entity according to the order in which these five control PDUs are triggered.

In step 304, the control PDU is sent through the MAC entity according to the promoted priority of the dedicated logical channel.

In summary, for the method for sending a control PDU provided in the present disclosure, the control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority, and thus the sending delay of the control PDU can be shortened.

After the bearer identifier for indicating the data bearer, to which the control PDU belongs, is set for the control PDU and since the control PDU needs to be processed by the RLC entity corresponding to the data bearer to which the control PDU belongs, when a plurality of control PDUs are sent on the dedicated logical channel, the RLC entity for processing each control PDU can be determined according to the bearer identifier, thereby guaranteeing that the control PDU can be processed successfully.

The first indication information indicates whether to send the control PDU on the dedicated logical channel. As such, when the requirement of certain PDU for delay is not high, the control PDU can be sent on an ordinary logical channel rather than the dedicated logical channel, thereby guaranteeing that the control PDU having the high requirement for delay is sent preferentially.

Figure 4:
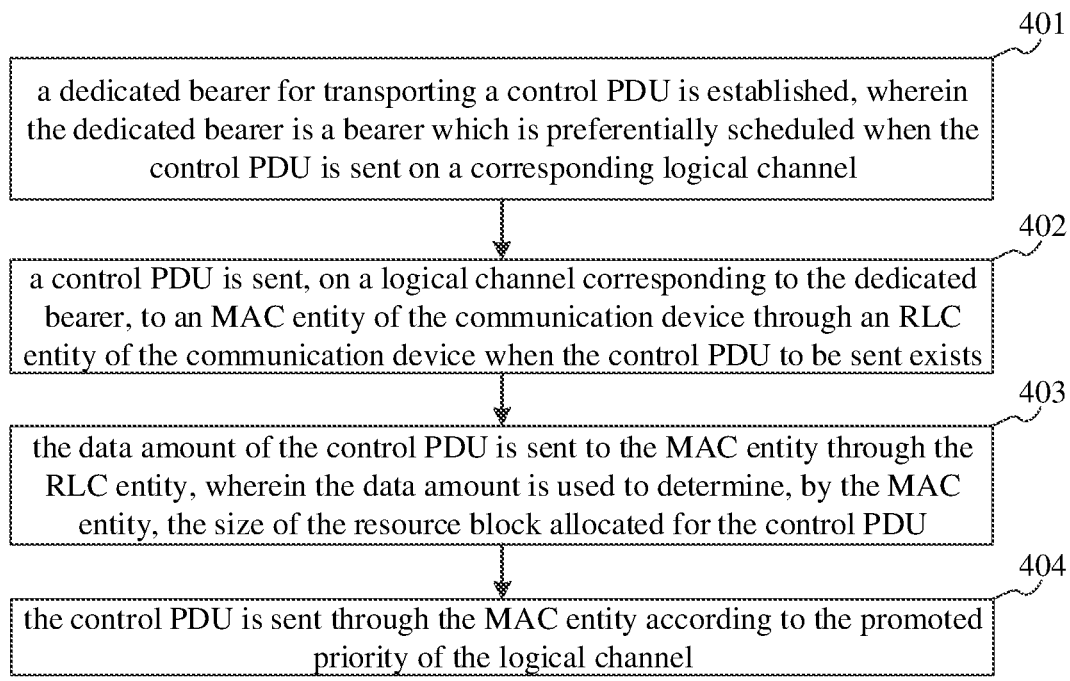
FIG. 4 is a flow chart of a method for sending a control PDU according to another exemplary embodiment.

FIG. 4 is a flow chart of a method for sending a control PDU according to another exemplary embodiment. The method for sending a control PDU is applied to the communication device. As shown in FIG. 4, the method for sending a control PDU includes the following steps.

In step 401, a dedicated bearer for transporting a control PDU is established, wherein the dedicated bearer is a bearer which is preferentially scheduled when the control PDU is sent on a corresponding logical channel of the dedicated bearer.

The control PDU can carry an RLC status report and can also carry other information, and the use of the control PDU is not limited in this embodiment.

The logical channel is a data transportation channel between the RLC entity and the MAC entity in the communication device, and one logical channel corresponds to one bearer. The bearers include a signaling bearer and a data bearer. The signaling bearer is used to transport signaling of a control plane. The data bearer is used to transport data of a user plane.

In this embodiment, the dedicated bearer is the bearer which is preferentially scheduled when the control PDU is sent on the corresponding logical channel. Namely, when data sent on the logical channel corresponding to the dedicated bearer is the control PDU, the priority of this logical channel is promoted. When the data sent on the logical channel corresponding to the dedicated bearer is not the control PDU, the priority of this logical channel is not promoted, and scheduling is performed according to the original priority of this logical channel. The dedicated bearer can be the signaling bearer, can also be the data bearer and is not limited in this embodiment.

The communication device needs to establish the dedicated bearer firstly and then configures the same. In the first implementation mode, when the communication device is a base station, bearer configuration information for configuring the dedicated bearer is generated and sent by the base station, and the bearer configuration information is used to instruct user equipment (UE) to configure the dedicated bearer. In the second implementation mode, when the communication device is the UE, the bearer configuration information of the dedicated bearer, which is generated and sent by the base station, is received and the dedicated bearer is configured according to the bearer configuration information.

During implementation, the base station configures the established dedicated bearer according to the generated bearer configuration information and sends the bearer configuration information to the UE. The UE configures the established dedicated bearer according to the bearer configuration information. After completion of the configuration, the base station and the UE can use the dedicated bearer to transport the control PDU. Optionally, the bearer configuration information can be written into a standard, and the base station and the UE configure the dedicated bearer respectively according to the bearer configuration information when executing the standard. After completion of the configuration, the base station and the UE can use the dedicated bearer to transport the control PDU.

In this embodiment, the bearer configuration information of the dedicated bearer includes RLC entity configuration information and logical channel configuration information. The RLC entity configuration information includes AM configuration information. The logical channel configuration information includes third indication information and second priority information. Or the logical channel configuration information includes the third indication information and does not include the second priority information and the second priority information is pre-stored in the communication device. The third indication information is used to indicate that the bearer is preferentially scheduled when the control PDU is sent on the corresponding logical channel of the bearer. The second priority information is used to indicate the promoted priority of the logical channel.

The RLC entity configuration information is used to configure the RLC entity, and the logical channel configuration information is used to configure the logical channel.

When the bearer configuration information includes the third indication information, it is determined that the bearer configured according to the bearer configuration information is the dedicated bearer. When the bearer configuration information does not include the third indication information, the fact that the bearer configured according to the bearer configuration information is not the dedicated bearer is determined.

The second priority information is used to indicate the promoted priority of the logical channel. The second priority information is the same as the first priority information, see the description for the first priority information in step 301 for details, and is not further described herein.

It should be noted that the third indication information can be located in the logical channel configuration information, and the second priority information can be located in the logical channel configuration information and the second priority information can also be pre-stored in the communication device. The bearer configuration information at this time is as shown above. In other implementation modes, the third indication information can be located in the RLC entity configuration information, and the second priority information can be located in the RLC entity configuration information and the second priority information can also be pre-stored in the communication device. The bearer configuration information at this time is as shown below.

In this embodiment, the bearer configuration information of the dedicated bearer includes RLC entity configuration information. The RLC entity configuration information includes AM configuration information, the third indication information and the second priority information. Or the RLC entity configuration information includes AM configuration information and the third indication information and does not include the second priority information which is pre-stored in the communication device. The third indication information is used to indicate that the bearer is preferentially scheduled when the control PDU is sent on the corresponding logical channel of the bearer. The second priority information is used to indicate the promoted priority of the logical channel.

Optionally, the bearer configuration information can further include a bearer identifier of the dedicated bearer. The bearer identifier is used to identify the dedicated bearer.

Optionally, the logical channel configuration information can further include a channel identifier and the channel identifier is used to identify the logical channel between the RLC entity and the MAC entity.

In step 402, a control PDU is sent, on a logical channel corresponding to the dedicated bearer, to a MAC entity of the communication device through an RLC entity of the communication device when the control PDU to be sent exists.

After the dedicated bearer is configured, the communication device can use the dedicated bearer to send data. Since when data sent on the logical channel corresponding to the dedicated bearer is the control PDU, the priority of this logical channel is promoted; and when the data sent on the logical channel corresponding to the dedicated bearer is not the control PDU, the priority of this logical channel is not promoted and scheduling is performed according to the original priority of this logical channel, in order to enable the MAC entity to determine whether the priority of this logical channel needs to be promoted, when the RLC entity sends data including the control PDU to the MAC entity, it also needs to send the second indication information to the MAC entity and the second indication information is used to indicate that the control PDU is to be sent on the logical channel; and when the RLC entity sends data not including the control PDU to the MAC entity, it does not need to send the second indication information to the MAC entity.

When the data to be sent includes the control PDU, the RLC entity calculates the data amount of this data and sends the data amount of this data and the second indication information to the MAC entity. The MAC entity determines the promoted priority of the logical channel according to the second indication information, allocates a resource block for the control PDU according to the priority and the data amount of the data, and sends the size of the resource block to the RLC entity. The RLC entity sends, on the logical channel, the control PDU to the MAC entity according to the size of the resource block.

Optionally, the MAC entity can also allocate the resource block for the control PDU according to other parameters such as QoS except the priority.

In step 403, the data amount of the control PDU is sent to the MAC entity through the RLC entity, wherein the data amount is used to determine, by the MAC entity, the size of the resource block allocated for the control PDU.

Since the data to be sent can include the control PDU and the data PDU at the same time, when the number of resource blocks which can be allocated by the MAC entity is small, the MAC entity can send the control PDU this time and then send the data PDU next time. Therefore, in order to guarantee that the control PDU is sent out, the RLC entity can also send the data amount of the control PDU to the MAC entity. As such, the MAC entity can allocate enough resource blocks for the control PDU to send the control PDU.

It should be noted that the sending sequence of the data amount of data to be sent, the second indication information and the data amounts of the control PDUs is not limited in this embodiment. Optionally, the RLC entity can send the data amount of data to be sent, the second indication information and the data amount of the control PDU simultaneously.

In step 404, the control PDU is sent through the MAC entity according to the promoted priority of the logical channel.

It should be noted that when the control PDUs are sent on the logical channels corresponding to a plurality of dedicated bearers, the MAC entity can allocate resource blocks for various PDUs according to the priorities of the plurality logical channels and send the various PDUs according to the resource blocks.

In summary, for the method for sending a control PDU provided in the present disclosure, the control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority are sent, and thus the sending delay of the control PDU can be shortened.

The data amount of the control PDU is sent to the MAC entity through the RLC entity, and since the MAC entity can determine, according to the data amount, the size of the resource block allocated for the control PDU, the MAC entity can allocate enough resource blocks for the control PDU to send the control PDU.

Figure 5:
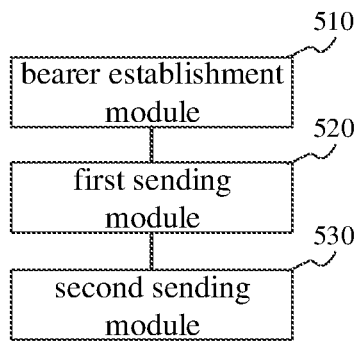
FIG. 5 is a block diagram of a device for sending a control PDU according to one exemplary embodiment.

FIG. 5 is a block diagram of a device for sending a control PDU according to an exemplary embodiment. The device for sending a control PDU is applied to a communication device. As shown in FIG. 5, the device for sending a control PDU comprises: a bearer establishment module 510, a first sending module 520 and a second sending module 530.

The bearer establishment module 510 is configured to establish a dedicated bearer for transporting a control PDU.

The first sending module 520 is configured to send, on a logical channel to which the dedicated bearer established by the bearer establishment module 510 corresponds, a control PDU to a media access control (MAC) entity of the communication device through a radio link control (RLC) entity of the communication device when the control PDU to be sent exists.

The second sending module 530 is configured to send the control PDU through the MAC entity according to the promoted priority of the logical channel.

In summary, for the device for sending a control PDU provided in the present disclosure, the control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority, and thus the sending delay of the control PDU can be shortened.

Figure 6:
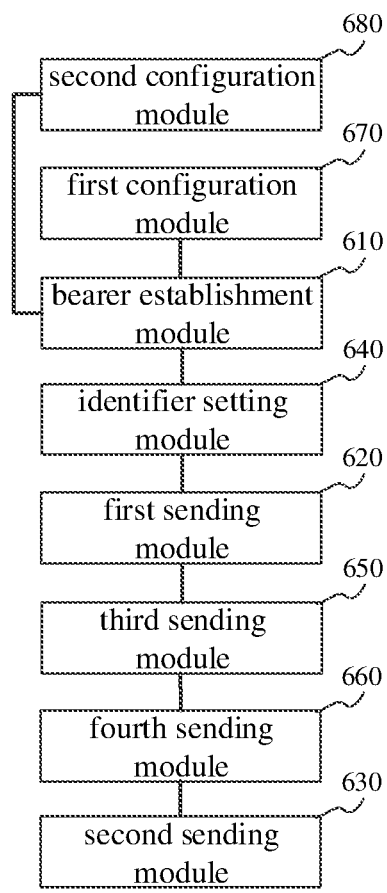
FIG. 6 is a block diagram of a device for sending a control PDU according to one exemplary embodiment.

FIG. 6 is a block diagram of a device for sending a control PDU according to an exemplary embodiment. The device for sending a control PDU is applied to a communication device. As shown in FIG. 6, the device for sending a control PDU comprises: a bearer establishment module 610, a first sending module 620 and a second sending module 630.

The bearer establishment module 610 is configured to establish a dedicated bearer for transporting a control PDU.

The first sending module 620 is configured to send, on a logical channel to which the dedicated bearer established by the bearer establishment module 510 corresponds, a control PDU to a media access control (MAC) entity of the communication device through a radio link control (RLC) entity of the communication device when the control PDU to be sent exists.

The second sending module 630 is configured to send the control PDU through the MAC entity according to the promoted priority of the logical channel.

Optionally, the logical channel to which the dedicated bearer corresponds is a dedicated logical channel only for transporting the control PDU.

Optionally, the device further comprises an identifier setting module 640.

The identifier setting module 640 is configured to set a bearer identifier for indicating a data bearer to which the control PDU belongs, for the control PDU.

Optionally, bearer configuration information of the data bearer to which the control PDU belongs comprises first indication information, and the first indication information is configured to indicate whether to send the control PDU on the dedicated logical channel.

Optionally, the dedicated bearer is a bearer which is preferentially scheduled when the control PDU is sent on the corresponding logical channel.

Optionally, the device further comprises a third sending module 650.

The third sending module 650 is configured to send second indication information to the MAC entity through the RLC entity, wherein the second indication information is configured to indicate that the control PDU is to be sent on the logical channel.

Optionally, the device further comprises a fourth sending module 660.

The fourth sending module 660 is configured to send the data amount of the control PDU to the MAC entity through the RLC entity, wherein the data amount is configured to determine, by the MAC entity, the size of a resource block allocated for the control PDU.

Optionally, the device further comprises a first configuration module 670 or a second configuration module 680.

The first configuration module 670 is configured to generate and send bearer configuration information for configuring the dedicated bearer when the communication device is a base station, wherein the bearer configuration information is configured to instruct user equipment (UE) to configure the dedicated bearer.

The second configuration module 680 is configured to receive the bearer configuration information of the dedicated bearer, which is generated and sent by the base station, when the communication device is the UE, and configure the established dedicated bearer according to the bearer configuration information.

Optionally, when the logical channel to which the dedicated bearer corresponds is the dedicated logical channel, the bearer configuration information of the dedicated bearer comprises RLC entity configuration information and logical channel configuration information, the RLC entity configuration information comprises acknowledged mode (AM) configuration information and does not comprise packet data convergence protocol (PDCP) configuration information, and the logical channel configuration information comprises first priority information; or the bearer configuration information of the dedicated bearer comprises RLC entity configuration information, the RLC entity configuration information comprises AM configuration information and first priority information and does not comprise PDCP configuration information; or the RLC entity configuration information comprises AM configuration information and does not comprise PDCP configuration information and first priority information, and the first priority information is pre-stored in the communication device.

Wherein, the first priority information is configured to indicate the promoted priority of the dedicated logical channel.

Optionally, when the dedicated bearer is a bearer which is preferentially scheduled when the control PDU is sent on the corresponding logical channel, the bearer configuration information of the dedicated bearer comprises RLC entity configuration information and logical channel configuration information, the RLC entity configuration information comprises AM configuration information; the logical channel configuration information comprises third indication information and second priority information; or the logical channel configuration information comprises third indication information and does not comprise second priority information, and the second priority information is pre-stored in the communication device; or the bearer configuration information of the dedicated bearer comprises RLC entity configuration information, the RLC entity configuration information comprises AM configuration information, third indication information and second priority information; or the RLC entity configuration information comprises AM configuration information and third indication information and does not comprise second priority information, and the second priority information is pre-stored in the communication device.

Wherein, the third indication information is used to indicate that the bearer is preferentially scheduled when the control PDU is sent on the corresponding logical channel, and the second priority information is used to indicate the promoted priority of the logical channel.

In summary, for the device for sending a control PDU provided in the present disclosure, the control PDU is sent to the MAC entity through the logical channel which is used to transport the control PDU, so that the MAC entity determines the promoted priority for the logical channel and sends the control PDU according to the priority. Since the priority of the logical channel is promoted, the MAC entity will preferentially send the control PDU rather than allocating, according to the related art, the fixed priority for the logical channel and after sending all data PDUs in a logical channel with the relatively higher priority, sending the control PDUs in a logical channel with the relatively lower priority, and thus the sending delay of the control PDU can be shortened.

After the bearer identifier for indicating the data bearer, to which the control PDU belongs, is set for the control PDU and since the control PDU needs to be processed by the RLC entity corresponding to the data bearer to which the control PDU belongs, when a plurality of control PDUs are sent on the dedicated logical channel, the RLC entity for processing each control PDU can be determined according to the bearer identifier, thereby guaranteeing that the control PDU can be processed successfully.

The first indication information indicates whether to send the control PDU on the dedicated logical channel. As such, when the requirement of certain PDU for delay is not high, the control PDU can be sent on an ordinary logical channel rather than the dedicated logical channel, thereby guaranteeing that the control PDU having the high requirement for delay is sent preferentially.

The data amount of the control PDU is sent to the MAC entity through the RLC entity, and since the MAC entity can determine, according to the data amount, the size of the resource block allocated for the control PDU, the MAC entity can allocate enough resource blocks for the control PDU to send the control PDU.

For the device in the above embodiment, the specific mode of each module for executing operations has been described in details in the embodiment of the related method and is not further described in detail herein.

One exemplary embodiment of the present disclosure provides a device for sending a control PDU capable of implementing the method for sending a control PDU provided in the present disclosure. The device for sending a control PDU includes a processor and a memory for storing a processor-executable instruction.

The processor is configured to:

establish a dedicated bearer for transporting a control PDU;

send, on a logical channel to which the dedicated bearer corresponds, a control PDU to a MAC entity of the communication device through an RLC entity of a communication device when the control PDU to be sent exists; and send the control PDU through the MAC entity according to the promoted priority of the logical channel.

Figure 7:
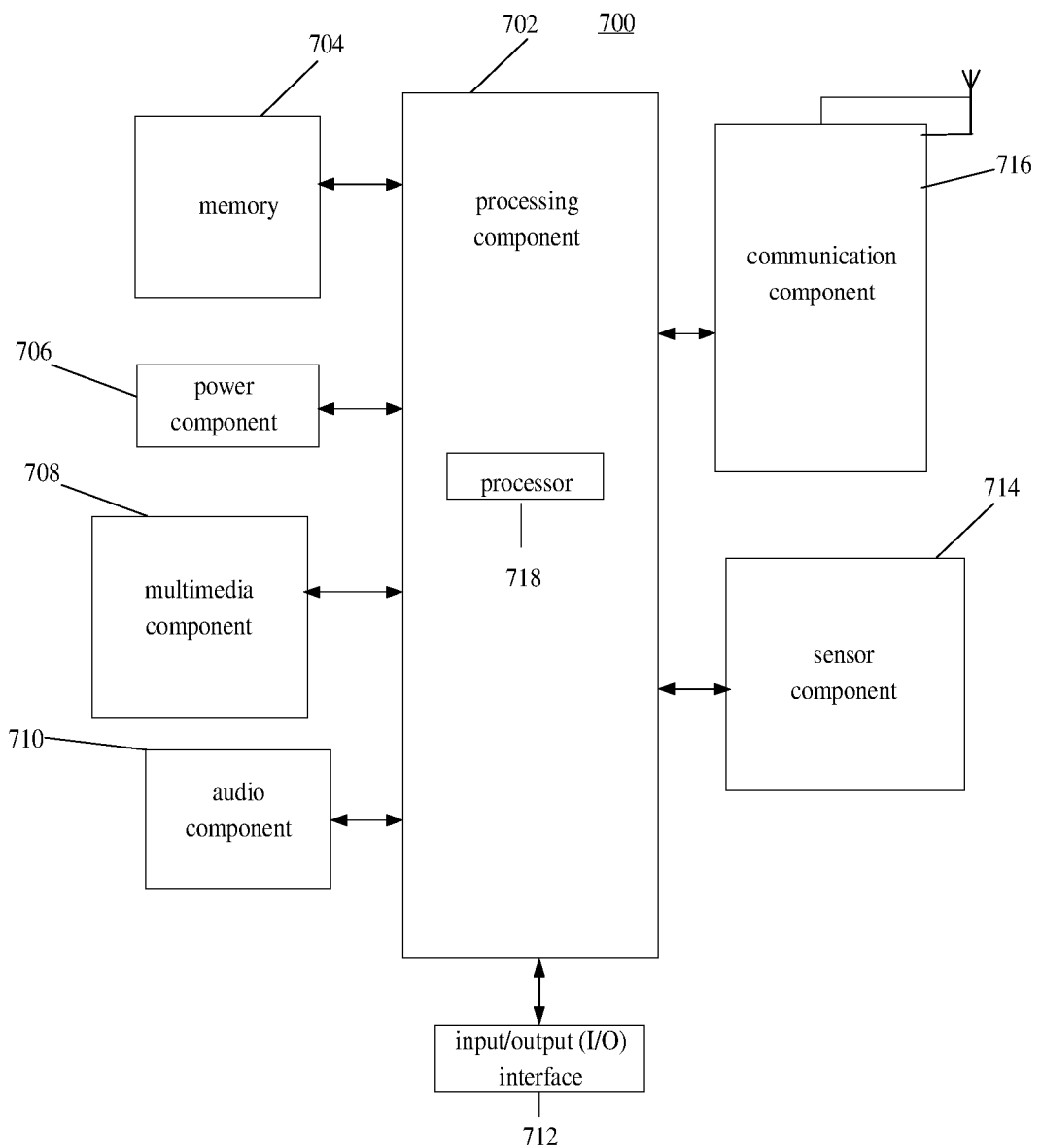
FIG. 7 is a block diagram of a device used for sending a control PDU according to one exemplary embodiment.

FIG. 7 is a block diagram of a device 700 used for sending a control PDU according to one exemplary embodiment. For example, the device 700 can be a mobile phone, a computer, a digital broadcast terminal, a messaging device, a gaming console, a tablet device, a medical device, a fitness equipment, a personal digital assistant, and the like.

Referring to FIG. 7, the device 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the device 700, such as the operations associated with display, telephone calls, data communications, camera operations, and recording operations. The processing component 702 can include one or more processors 718 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, videos, etc. The memory 704 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense the duration and pressure associated with the touch or swipe action. In some embodiments, the multimedia component 708 includes a front camera and/or a rear camera. The front camera and the rear camera can receive external multimedia data while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone (MIC) configured to receive external audio signals when the device 700 is in an operation mode, such as a call mode, a recording mode, and a voice recognition mode. The received audio signal can be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons can include, but are not limited to, a home button, a volume button, a start button, and a lock button.

The sensor component 714 includes one or more sensors to provide status assessments of various aspects of the device 700. For instance, the sensor component 714 can detect an on/off status of the device 700, relative positioning of components, e.g., the display device and the mini keyboard of the device 700, and the sensor component 714 can also detect a position change of the device 700 or a component of the device 700, presence or absence of user contact with the device 700, orientation or acceleration/deceleration of the device 700, and temperature change of the device 700. The sensor component 714 can include a proximity sensor configured to detect the presence of nearby objects without any physical contact. The sensor component 714 can also include a light sensor, such as a CMOS or CCD image sensor, used for imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In an exemplary embodiment, the communication component 716 receives broadcast signals or broadcast associated information from an external broadcast management system via a broadcast channel. In an exemplary embodiment, the communication component 716 further includes a near field communication (NFC) module to facilitate short-range communications.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium having stored therein instructions is also provided, such as the memory 704 having stored therein instructions, executable by the processor 718 in the device 700, for performing the above-described methods. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sending a control protocol data unit (PDU), used in a communication device, the method comprising:

establishing a dedicated bearer for transporting a control PDU;

when a control PDU to be sent exists, sending, on a logical channel to which the dedicated bearer corresponds, the control PDU to a media access control (MAC) entity of the communication device through a radio link control (RLC) entity of the communication device; and sending the control PDU through the MAC entity according to a promoted priority of the logical channel, wherein the logical channel to which the dedicated bearer corresponds is a dedicated logical channel only for transporting the control PDU, and the method further comprises:

setting, for the control PDU, a bearer identifier for indicating a data bearer to which the control PDU belongs, wherein bearer configuration information of the data bearer to which the control PDU belongs comprises first indication information, and the first indication information is used to indicate whether to send the control PDU on the dedicated logical channel;

when the communication device is a base station, generating and sending bearer configuration information of the dedicated bearer, wherein the bearer configuration information of the dedicated bearer is used to instruct user equipment (UE) to configure the dedicated bearer; and when the communication device is the UE, receiving the bearer configuration information of the dedicated bearer, which is generated and sent by the base station, and configuring the dedicated bearer according to the bearer configuration information of the dedicated bearer;

wherein when the dedicated bearer is a bearer which is preferentially scheduled when the control PDU is sent on the corresponding logical channel, the bearer configuration information of the dedicated bearer comprises one of:

RLC entity configuration information and logical channel configuration information, wherein the RLC entity configuration information comprises acknowledged mode (AM) configuration information, and the logical channel configuration information comprises second indication information and priority information;

RLC entity configuration information and logical channel configuration information, wherein the logical channel configuration information comprises the second indication information and does not comprise the priority information, and the priority information is pre-stored in the communication device;

RLC entity configuration information, wherein the RLC entity configuration information comprises the AM configuration information, the second indication information, and the priority information; or RLC entity configuration information, wherein the RLC entity configuration information comprises the AM configuration information and the second indication information and does not comprise the priority information, and the priority information is pre-stored in the communication device;

wherein the second indication information is used to indicate that the bearer is preferentially scheduled when the control PDU is sent on the corresponding logical channel, and the priority information is used to indicate the promoted priority of the logical channel.

2. The method according to claim 1, wherein the dedicated bearer is a bearer which is preferentially scheduled when the control PDU is sent on the corresponding logical channel, and the method further comprises:

sending third indication information to the MAC entity through the RLC entity, wherein the third indication information is used to indicate that the control PDU is to be sent on the logical channel.

3. The method according to claim 1, wherein:

when the bearer configuration information of the dedicated bearer comprises the RLC entity configuration information and the logical channel configuration information, and the RLC entity configuration information comprises the AM configuration information, the RLC entity configuration information does not comprise packet data convergence protocol (PDCP) configuration information.

4. A device for sending a control protocol data unit (PDU), used in a communication device, comprising:

a processor; and a memory for storing a processor-executable instruction, wherein the processor is configured to:

establish a dedicated bearer for transporting a control PDU;

send, when a control PDU to be sent exists, on a logical channel to which the dedicated bearer corresponds, the control PDU to a media access control (MAC) entity of the communication device through a radio link control (RLC) entity of the communication device; and send the control PDU through the MAC entity according to a promoted priority of the logical channel, wherein the logical channel to which the dedicated bearer corresponds is a dedicated logical channel only for transporting the control PDU, and the processor is further configured to:

set, for the control PDU, a bearer identifier for indicating a data bearer to which the control PDU belongs, wherein bearer configuration information of the data bearer to which the control PDU belongs comprises first indication information, and the first indication information is used to indicate whether to send the control PDU on the dedicated logical channel;

when the communication device is a base station, generate and send bearer configuration information of the dedicated bearer, wherein the bearer configuration information of the dedicated bearer is used to instruct user equipment (UE) to configure the dedicated bearer; and when the communication device is the UE, receive the bearer configuration information of the dedicated bearer, which is generated and sent by the base station, and configure the dedicated bearer according to the bearer configuration information of the dedicated bearer;

wherein when the dedicated bearer is a bearer which is preferentially scheduled when the control PDU is sent on the corresponding logical channel, the bearer configuration information of the dedicated bearer comprises one of:
- RLC entity configuration information and logical channel configuration information, wherein the RLC entity configuration information comprises acknowledged mode (AM) configuration information, and the logical channel configuration information comprises second indication information and priority information;
- RLC entity configuration information and logical channel configuration information, wherein the logical channel configuration information comprises the second indication information and does not comprise the priority information, and the priority information is pre-stored in the communication device;
- RLC entity configuration information, wherein the RLC entity configuration information comprises the AM configuration information, the second indication information, and the priority information; or
- RLC entity configuration information, wherein the RLC entity configuration information comprises the AM configuration information and the second indication information and does not comprise the priority information, and the priority information is pre-stored in the communication device;
- wherein the second indication information is used to indicate that the bearer is preferentially scheduled when the control PDU is sent on the corresponding logical channel, and the priority information is used to indicate the promoted priority of the logical channel.

5. The device according to claim 4, wherein the dedicated bearer is a bearer which is preferentially scheduled when the control PDU is sent on the corresponding logical channel, and the processor is further configured to:
send third indication information to the MAC entity through the RLC entity, wherein the third indication information is configured to indicate that the control PDU is to be sent on the logical channel.

6. The device according to claim 4, wherein:
when the bearer configuration information of the dedicated bearer comprises the RLC entity configuration information and the logical channel configuration information, and the RLC entity configuration information comprises the AM configuration information, the RLC entity configuration information does not comprise packet data convergence protocol (PDCP) configuration information.

7. The method according to claim 1, wherein:
when the bearer configuration information of the dedicated bearer comprises the RLC entity configuration information, and the RLC entity configuration information comprises the AM configuration information, the second indication information, and the priority information, the RLC entity configuration information does not comprise PDCP configuration information.

8. The method according to claim 1, wherein:
when the bearer configuration information of the dedicated bearer comprises the RLC entity configuration information, and the RLC entity configuration information comprises the AM configuration information and the second indication information and does not comprise the priority information, the RLC entity configuration information does not comprise PDCP configuration information.

9. The device according to claim 4, wherein:
when the bearer configuration information of the dedicated bearer comprises the RLC entity configuration information, and the RLC entity configuration information comprises the AM configuration information, the second indication information, and the priority information, the RLC entity configuration information does not comprise PDCP configuration information.

10. The device according to claim 4, wherein:
when the bearer configuration information of the dedicated bearer comprises the RLC entity configuration information, and the RLC entity configuration information comprises the AM configuration information and the second indication information and does not comprise the priority information, the RLC entity configuration information does not comprise PDCP configuration information.

* * * * *